United States Patent
Ostyn

(10) Patent No.: US 12,480,550 B2
(45) Date of Patent: Nov. 25, 2025

(54) OVERLOAD CLUTCH WITH JOINT TORQUE AND DISENGAGEMENT SENSING

(71) Applicant: UNIVERSITEIT GENT, Ghent (BE)

(72) Inventor: Frederik Leopold A Ostyn, Oeselgem (BE)

(73) Assignee: Universiteit Gent, Ghent (BE)

( * ) Notice: Subject to any disclaimer, the term of this patent is extended or adjusted under 35 U.S.C. 154(b) by 0 days.

(21) Appl. No.: 18/702,369

(22) PCT Filed: Sep. 23, 2022

(86) PCT No.: PCT/EP2022/076544
§ 371 (c)(1),
(2) Date: Apr. 18, 2024

(87) PCT Pub. No.: WO2023/066602
PCT Pub. Date: Apr. 27, 2023

(65) Prior Publication Data
US 2024/0401649 A1     Dec. 5, 2024

(30) Foreign Application Priority Data
Oct. 20, 2021   (EP) ..................... 21203799

(51) Int. Cl.
F16D 7/02       (2006.01)
F16D 7/04       (2006.01)
(Continued)

(52) U.S. Cl.
CPC ............ F16D 7/025 (2013.01); F16D 7/046 (2013.01); F16D 43/2026 (2013.01); F16D 43/215 (2013.01); F16D 2300/18 (2013.01)

(58) Field of Classification Search
CPC ...... F16D 7/025; F16D 7/046; F16D 43/2026; F16D 43/215; F16D 2300/18
See application file for complete search history.

(56) References Cited

U.S. PATENT DOCUMENTS

2023/0287943 A1* 9/2023 Ostyn ............... F16D 7/021

FOREIGN PATENT DOCUMENTS

CN       111089124 A     5/2020

OTHER PUBLICATIONS

Ostyn et al.: "Comparison of Collision Detection Techniques for High-Speed Industrial Robot Actuators with Overload Clutch", 2021 IEEE/ASME International Conference on Advanced Intelligent Mechatronics (AIM), IEEE, Jul. 12, 2021 (Jul. 12, 2021), pp. 448-453, XP033963499, DOI: 10.1109/AIM46487.2021.9517560.

* cited by examiner

Primary Examiner — Timothy Hannon
(74) Attorney, Agent, or Firm — Ipsilon USA—NLO

(57) ABSTRACT

An overload clutch comprising an input flange and an output flange, said clutch being configured to transmit torque between the input flange and the output flange and to disengage the clutch when the torque exceeds a predetermined threshold, characterised in, that the clutch comprises one or more sensing means at least partially integrated in at least one of the input and output flanges, and that the one or more sensing means are adapted to jointly determine the torque applied to transmitted between the input flange and the output flange of the clutch and to detect the disengagement of the clutch. A device comprising the clutch, a gear unit connected to the input flange, and a motor connected to the gear unit, configured to provide torque to the input flange through the gear unit.

14 Claims, 8 Drawing Sheets

(51) Int. Cl.
*F16D 43/202* (2006.01)
*F16D 43/21* (2006.01)

OVERLOAD CLUTCH WITH JOINT TORQUE AND DISENGAGEMENT SENSING

FIELD OF THE INVENTION

The present invention relates to an overload clutch and a device comprising the clutch.

BACKGROUND ART

Joint torque sensors (JTS) are typically used to measure external load on a device, such as an industrial robot or an arm thereof. Two main types of JTS are described as follows.

The first type of JTS is a reactive type based on resistive measurements, where strain gauges measure a resistance change caused by a deformation of a loaded base structure of, e.g. the robot arm. This deformation is typically caused by an external load, and is determined based on a structural model of the base structure. The reactive-type JTS provides high accuracy of resistive measurements, however, it comes at a high cost of assembly and installation. The strain gauges often require precise and manual assembly, and a correct installation of the strain gauges is crucial to achieving the best measurement results possible. In industrial robotics, torque sensing enables intuitive teaching by demonstration, e.g. by just moving the robot by hand to the desired position instead of programming. However, the excessive cost of the resistive-type JTS is not justifiable if only used while teaching the robot at low speed, but not while the robot is executing its program at high speed. Therefore, resistive-type JTS sensors are rarely included in high-speed robots, in contrast to slow-moving collaborative robots.

The second type of JTS is a capacitive type based on capacitive measurements between the deformed structure and an non-deformed reference structure. In comparison to a resistive-type JTS, the capacitive-type can be manufactured at a lower cost and can be more easily installed, but is less accurate.

In both the resistive-type and the capacitive-type JTS a base structure is required, e.g. of a robot arm. The base structure would need to be added to an actuator, resulting in an increased volume, complexity and weight. Furthermore, in the case of a high-speed industrial robot, an overload clutch is present, such as a Combined Friction Cam Clutch (CFCC) described by Ostyn et al. in their article (Overload Clutch Design for Collision Tolerant High-Speed Industrial Robots, IEEE Robotics and Automation Letters, Vol. 6, No. 2, pages 863-870, April 2021), the additional base structure would present even more complexity of assembly and installation.

Kim et al. have discussed in their article (Safe joint module for safe robot arm based on passive and active compliance method, Mechatronics, Vol. 22, pages 1023-1030, 2012) a safety joint module by stacking a JTS on top of an overload clutch for collision detection. However, this safety joint module provides increased volume, while also increasing the complexity of assembly and installation.

Choi et al., discuss in their article (A Safe Robot Arm with Safe Joints and Gravity Compensator, International Journal of Control, Automation, and Systems, Vol. 11, No. 2, pages 362-368, 2013) adding joint torque sensing capabilities to an overload clutch to measure forces. However, due to the limited capacity of pressure sensors, the forces need to be scaled down, thereby requiring additional structures and increasing the volume, complexity and weight of the system.

Despite the efforts to provide an overload clutch design for the safe use of robot arms, there is still a need for an overload clutch with an integrated JTS that does not increase the volume of the overall clutch (including the JTS) and does not increase the complexity of installation or assembly of the overall clutch.

The present invention aims at addressing the issues listed above.

SUMMARY OF THE INVENTION

According to a first aspect, the present invention provides an overload clutch comprising an input flange and an output flange, said clutch being configured to transmit torque between the input flange and the output flange and to disengage the clutch when the torque exceeds a predetermined threshold, characterised in, that the clutch comprises one or more sensing means at least partially integrated in at least one of the input flange and the output flange, and that the one or more sensing means are adapted to jointly determine the torque (e.g., externally applied torque) transmitted between the input flange and the output flange of the clutch and detect the disengagement of the clutch.

By integrating one or more sensing means (e.g., one or more JTSs) in an overload clutch (e.g., a CFCC), active and passive compliant behavior can be realized in a single device. Furthermore, an additional base structure can be eliminated as at least one of the input and output flanges of the clutch can be used as base structure. Thus, the overload clutch of the present invention provides reduced volume of an overload clutch with integrated sensing means. Moreover, the overload clutch of the present invention provides reduced complexity of an overload clutch with sensing means.

According to a second aspect, the present invention provides a device comprising the overload clutch, a gear unit connected to the input flange, and a motor connected to the gear unit, configured to provide torque to the input flange through the gear unit.

Other aspects, advantages, and salient features of the disclosure will become apparent to those skilled in the art from the following detailed description, which, taken in conjunction with the annexed drawings, discloses various embodiments of the present disclosure.

Furthermore, preferred embodiments and their advantages are provided in the description and the dependent claims.

BRIEF DESCRIPTION OF THE DRAWINGS

The present invention will be discussed in more detail below, with reference to the attached drawings, in which.

DESCRIPTION OF EMBODIMENTS

Figure 1:
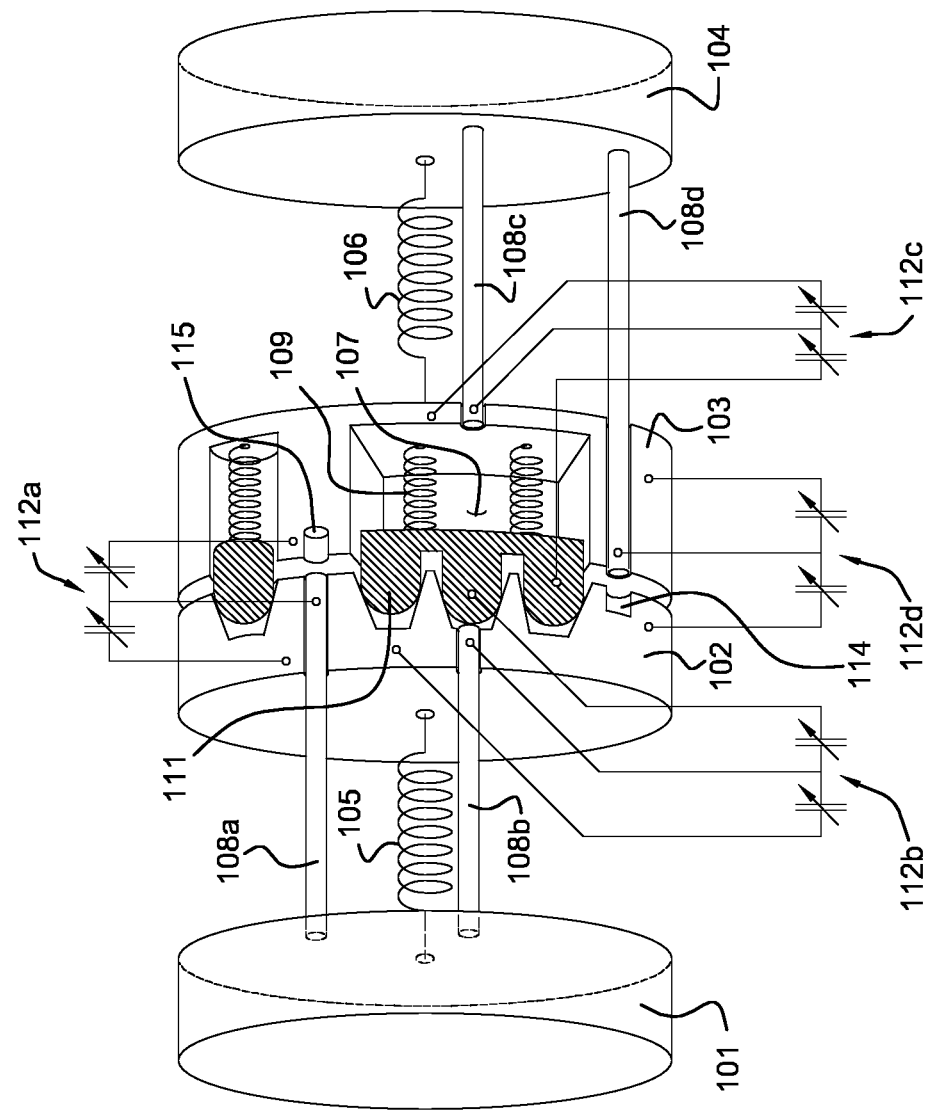
FIGS. 1-4 schematically illustrate exploded perspective view of example embodiments of an overload clutch according to the present invention.

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the disclosure.

Furthermore, the terms first, second, third and the like in the description and in the claims, are used for distinguishing between similar elements and not necessarily for describing a sequential or chronological order. The terms are interchangeable under appropriate circumstances and the embodiments of the disclosure can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the disclosure may be implemented rather than as limiting the scope of the disclosure.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present disclosure, the only enumerated components of the device are A and B, and further the claim should be interpreted as including equivalents of those components.

Different aspects of the present disclosure will be described more fully hereinafter with reference to the enclosed drawings. The embodiments disclosed herein can, however, be realized in many different forms and should not be construed as being limited to the aspects set forth herein.

The term "overload clutch" may be interpreted as a torque limiting clutch, e.g. as a deterrent to many torque spike and overload issues.

The terms "engage" and "disengage" the clutch are to be interpreted as connecting and disconnecting, respectively, the output flange to/from the input flange. In an engaged state of the clutch, torque can be transmitted from the input flange to the output flange. The clutch is configured to, during use, be moved from the engaged state to a disengaged state upon the transmitted torque exceeding a clutch threshold torque.

The following embodiments of an overload clutch according to the present invention will be described with reference to FIGS. 1-4.

In the case where the clutch comprises one sensing mean, said sensing mean is adapted to jointly determine the external torque and detect the disengagement of the clutch. In the case where the clutch comprises a plurality of sensing means, each of said plurality of sensing means is adapted to jointly determine the external torque and detect the disengagement of the clutch.

In embodiments, said at least one flange comprises a first rigid body (101; 201; 301; 401; 104; 204; 304; 404) and a second rigid body (102; 202; 302; 402; 103; 203; 303; 403) connected to each other via a deformable structure (105; 205; 305; 405; 106; 206; 306; 406) deformable in an angular direction of said at least one flange, e.g. in response to an external torque, the deformable structure (105; 205; 305; 405; 106; 206; 306; 406) being defined by at least one torsion spring constant. In FIGS. 1-4, the deformable structure is shown as a torsion spring to illustrate that the deformable structure is defined by a torsion spring constant. The deformable structure is described in further detail with reference to FIGS. 5B, 6B and 7B. The one or more sensing means may comprise a sensor structure (108a-108d; 208a-208d; 308a-308b; 408a-408b) having an electrode connected to one of the first and second rigid bodies and electrically insulated therefrom, the sensor structure (108a-108d; 208a-208d; 308a-308b; 408a-408b) being configured to measure a first capacitance between the electrode and the other of said one of the first and second rigid bodies in said at least one flange and configured to measure a second capacitance between the electrode and the other of said at least one flange (e.g., the first and/or second rigid body of the other of said at least one flange). The one or more sensing means may further comprise an electronic circuit configured to determine the external torque based on the measured first capacitance and configured to detect disengagement of the clutch based on the measured second capacitance.

It will be understood that the term "angular direction" may refer to an arrangement around an axis, for example a concentric arrangement around an axis (e.g., a central axis).

Figure 5A:
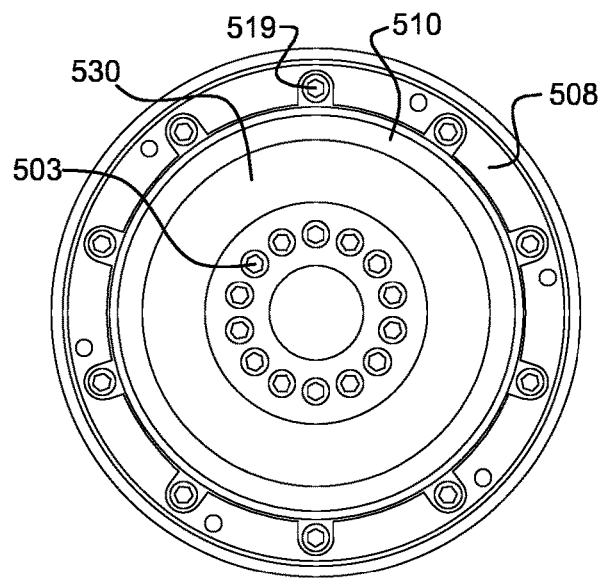
FIG. 5A schematically illustrates a top view of an example embodiment of a clutch according to the present invention.

In embodiments, the overload clutch may comprise a sensing mean comprising at least one sensor structure, for example, a circuit board (e.g., a PCB) wherein one, two, three, four, five, six, seven, eight, etc. sensor structures are electrically connected thereto. This is shown in the exemplary embodiments relating to FIGS. 5-7, where six sensor structures are connected to a PCB. The sensing mean may further comprise at least one electronic circuit electrically connected to the circuit board, for example an electronic circuit for each sensor structure, an electronic circuit for two respective sensor structures, an electronic circuit for three respective sensor structures, an electronic circuit for all sensor structures, etc. Respective sensor structures may be sensor structures having an electrode facing different sides of the same reference, e.g., a protruding portion. The clutch may comprise more than one sensing mean each of which comprising at least one sensor structure and at least one electronic circuit as described above.

The deformable structure (105; 205; 305; 405; 106; 206; 306; 406) and the sensor structure (108*a*-108*d*; 208*a*-208*d*; 308*a*-308*b*; 408*a*-408*b*) allow for a more efficient integration of the one or more sensing means in the clutch and a more effective way of jointly determining the external torque and detecting the disengagement of the clutch, without increasing the volume of the clutch and/or the complexity of assembling the clutch.

In embodiments, the electrode comprises a first face and a second face, the first face having a main surface facing a protruding portion of the other of said one of the first and second rigid bodies, and the second face having a main surface facing the other of said at least one of the input and output flanges. The first and/or second faces may have a polygonal shape, such as triangular, quadrilateral, pentagonal, semi-circular, etc. The first face may have a different shape from the second shape. The first face may have another surface (e.g., an upper or lower surface), which may correspond to a thickness of the first face, facing the other of said at least one of the input and output flanges, as can be seen in the case of the sensor structures (538; 638) or the electrode therein of FIGS. 5B, 6B and 6C. The second face may have another surface, which may correspond to a thickness of the second face, facing the angular direction of a flange or rigid body. In examples, the electrode is L-shaped, as is in the case of FIGS. 6B, 6C where the first and second faces have a quadrilateral shape, or the first and second faces of the electrode are perpendicular, as is in the case of FIG. 7B where at least the second face has a semi-circle shape. The electrode ay comprise an angle between the first and second faces (e.g., between 45-90 degrees, 90-135 degrees, 45-135 degrees, etc.). The angle may correspond to an angle formed between a surface/side of a protruding portion protruding portion and a surface of said at least one flange. In embodiments, part of the electrode having the second face may be connected to said at least one flange, e.g. on the PCB connected to said at least one flange.

In embodiments, the electrode comprises a base surface (e.g., of an opposite side) and a sloped surface (e.g., of a hypotenuse), the base surface facing a protruding portion of the other of said one of the first and second rigid bodies, and the sloped surface extending in the radial direction of said at least one flange. The electrode may further comprise a further surface (e.g., of an adjacent side) facing said at least one flange. Examples of such an electrode are triangular-shaped, right-angled triangular shaped, or wedge-shaped. In embodiments, the further surface may be connected to said at least one flange, e.g. on the PCB connected to said at least one flange.

In further embodiments, the first capacitance is measured by the sensor structure (108*a*-108*d*; 208*a*-208*d*; 308*a*-308*b*; 408*a*-408*b*) between the first face of the electrode and the other of said at least one of the input and output flanges, and the second capacitance is measured by the sensor structure (108*a*-108*d*; 208*a*-208*d*; 308*a*-308*b*; 408*a*-408*b*) between the second face of the electrode and the other of said one of the first and second rigid bodies. A capacitance may be given by $C=\epsilon_0 A/d$, where $\epsilon_0$ is a dielectric constant, A is an area of a surface of the electrode and d the distance between the electrode and the other of said at least one flange and/or the other of said one of the first and second rigid bodies. Furthermore, a change in capacitance may be given by $$\Delta C = \epsilon_0 \epsilon_r \left( \frac{\Delta A}{d_0 - \Delta d} - \frac{\Delta A}{d_0} \right),$$

due to a change in distance and/or area, where $\epsilon_r$ is a relative permittivity and $d_0$ is an initial distance. The capacitance or change thereof may be given by other formulas known in the art. In one example, for the first capacitance, A is the area of the main surface of the first face and d is the distance between the main surface and the other of said one of the first and second rigid bodies, e.g. the protruding portion. For the second capacitance, A is the area of the main surface of the second face and d is the distance between the second face, and a surface of the other of said at least one of the input and output flanges facing the second face. Additionally or alternatively, the second capacitance may be measured between the other surface of the first face and the other of said at least one flange. In another example, the second capacitance may be measured based on A, the area of the sloped surface of the electrode, and d, the distance between the sloped surface and the other of said at least one of the input and output flanges. The distance may be determined from one point on the sloped surface or as an average distance from a plurality of points on the sloped surface. The sloped surface may provide more surface area than a conventional electrode or the L-shaped electrode or the electrode with perpendicular first and second faces, and as a result provide more sensitive measurements of capacitance.

In embodiments, a first sensor structure (108*a*; 308*a*; 108*d*; 308*b*) comprised in the one or more sensing means is connected to the first rigid body (101; 301; 104; 304) in said at least one flange and electrically insulated from the first rigid body (101; 301; 104; 304), wherein the first sensor structure (108*a*; 308*a*; 108*d*; 308*b*) is configured to measure the first capacitance between the electrode in the first sensor structure (108*a*; 308*a*; 108*d*; 308*b*) and the second rigid body (102; 302; 103; 303) in said at least one flange, and measure the second capacitance between the electrode and the second rigid body (102; 302; 103; 303) in the other of said at least one flange. The first capacitance may be a result of a deformation of the deformable structure (105; 305; 106; 306) in the angular direction of said at least one flange, and the second capacitance may be a result of a displacement of the second rigid body in said at least one flange with respect to the second rigid body in the other of said at least one flange, for example, said displacement is an angular displacement of the second rigid body (102; 302) in the input flange (101, 102; 301, 302) with respect to the second rigid body (103; 303) in the output flange (103, 104; 303, 304). This is shown in the exemplary embodiments relating to FIGS. 1 and 3.

In embodiments, a second sensor structure (208*a*; 408*a*; 208*d*; 408*b*) comprised in the one or more sensing means is connected to the second rigid body (202; 402; 203; 403) in said at least one flange and electrically insulated from the second rigid body (202; 402; 203; 403), wherein the second sensor structure (208*a*; 408*a*; 208*d*; 408*b*) is configured to measure the first capacitance between the electrode in the second sensor structure (208*a*; 408*a*; 208*d*; 408*b*) and the first rigid body (201; 401; 204; 404) in said at least one flange, and measure the second capacitance between the electrode and the second rigid body (202; 402; 203; 403) in the other of said at least one flange. The first capacitance may be a result of a deformation of the deformable structure (205; 405; 206; 406) in the angular direction of said at least one flange, and the second capacitance may be a result of a displacement of the second rigid body in said at least one flange with respect to the second rigid body in the other of said at least one flange, for example, said displacement is an angular displacement of the second rigid body (102; 402) in the input flange (101, 102; 401, 402) with respect to the second rigid body (103; 403) in the output flange (103, 104; 403, 404). This is shown in the exemplary embodiments relating to FIGS. 2 and 4.

In embodiments, the second rigid body in the other of said at least one flange comprises a spring plate (107; 207; 307; 407) and a plurality of springs (109; 209; 309; 409) allowing the spring plate (107; 207; 307; 407) to move axially relative to the second rigid body and to respectively engage or disengage both flanges. For example, the spring plate (107; 207; 307; 407) and at last one spring (109; 209; 309; 409) are comprised in the second rigid body (103; 203; 303; 403) in the output flange, as shown in FIGS. 1-4.

Figure 2:
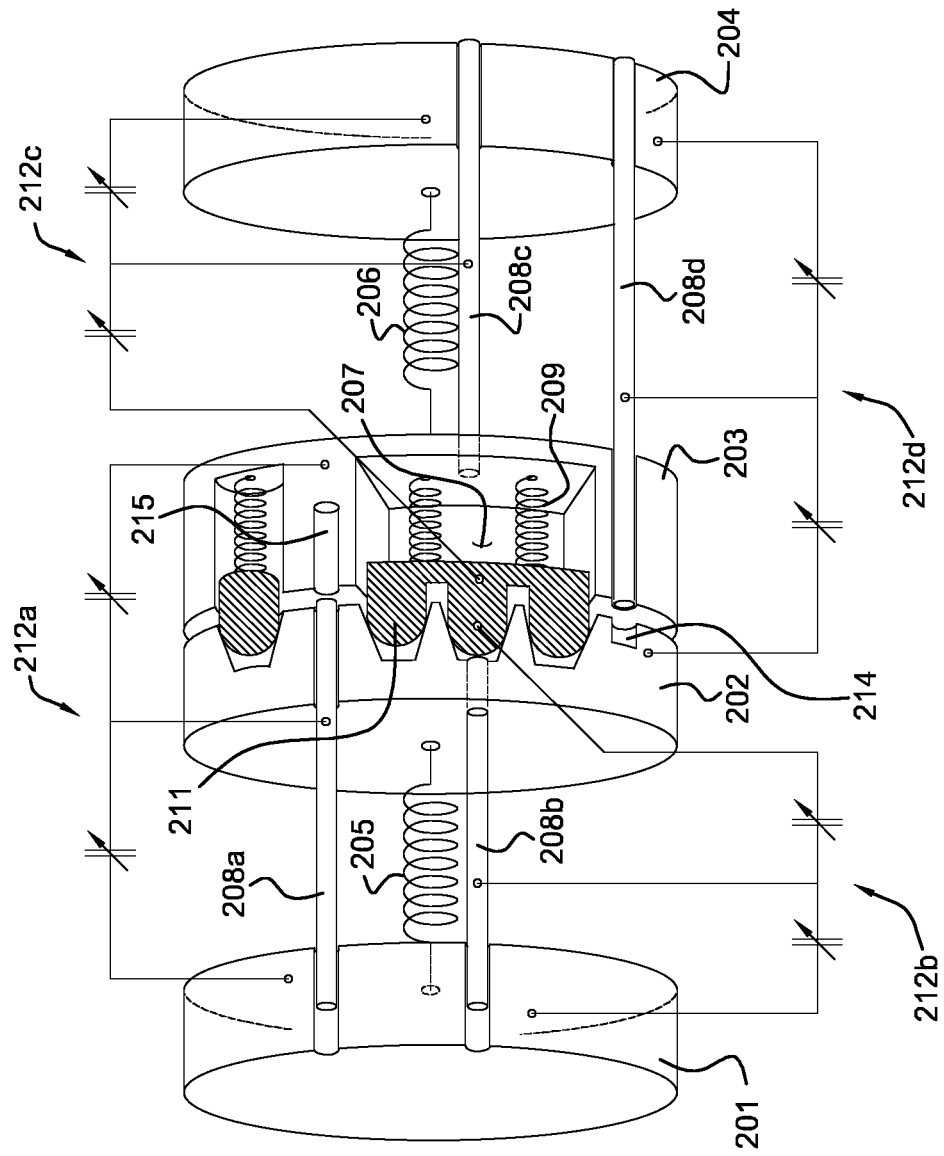
Figure 3:
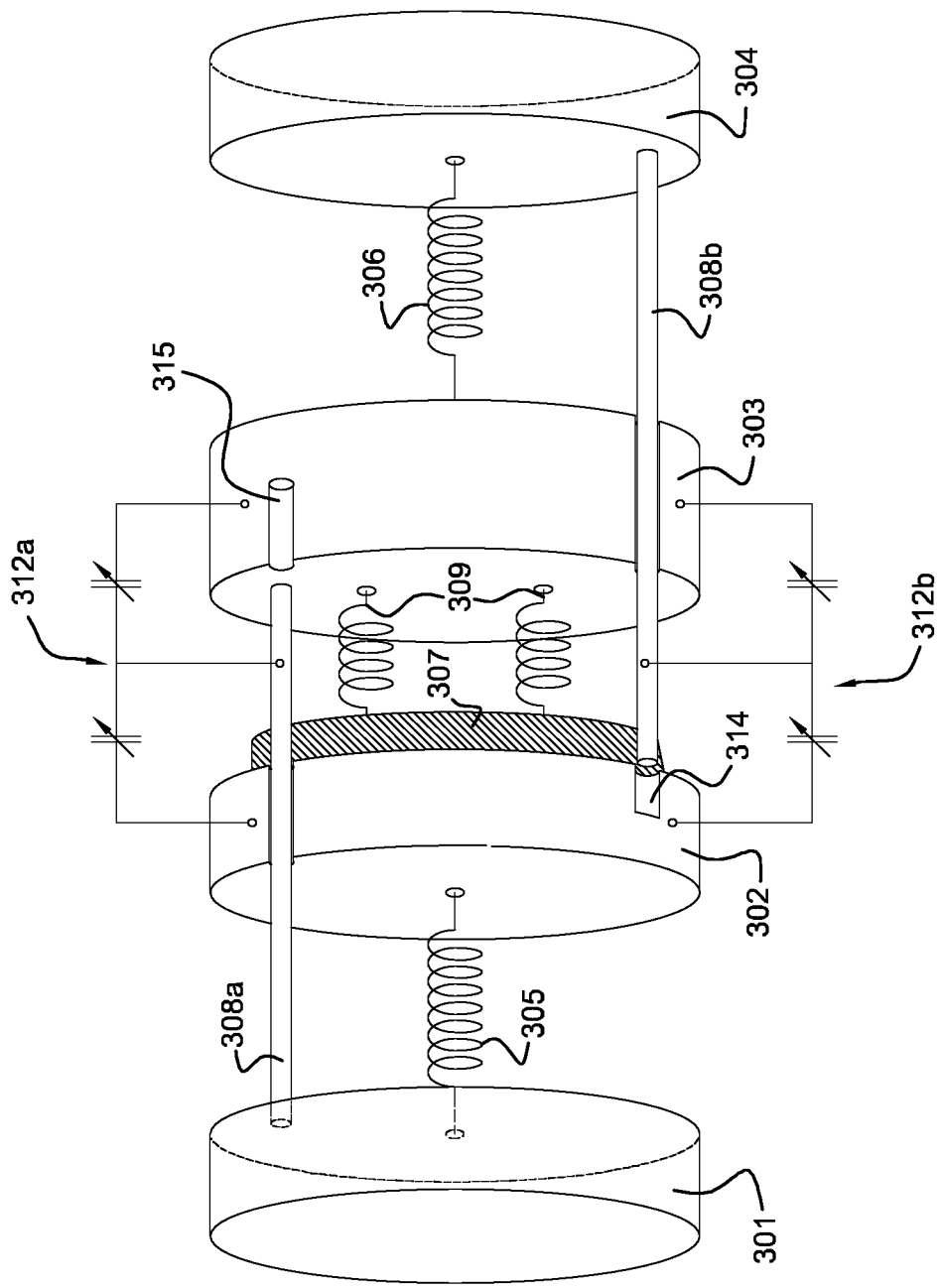
Figure 4:
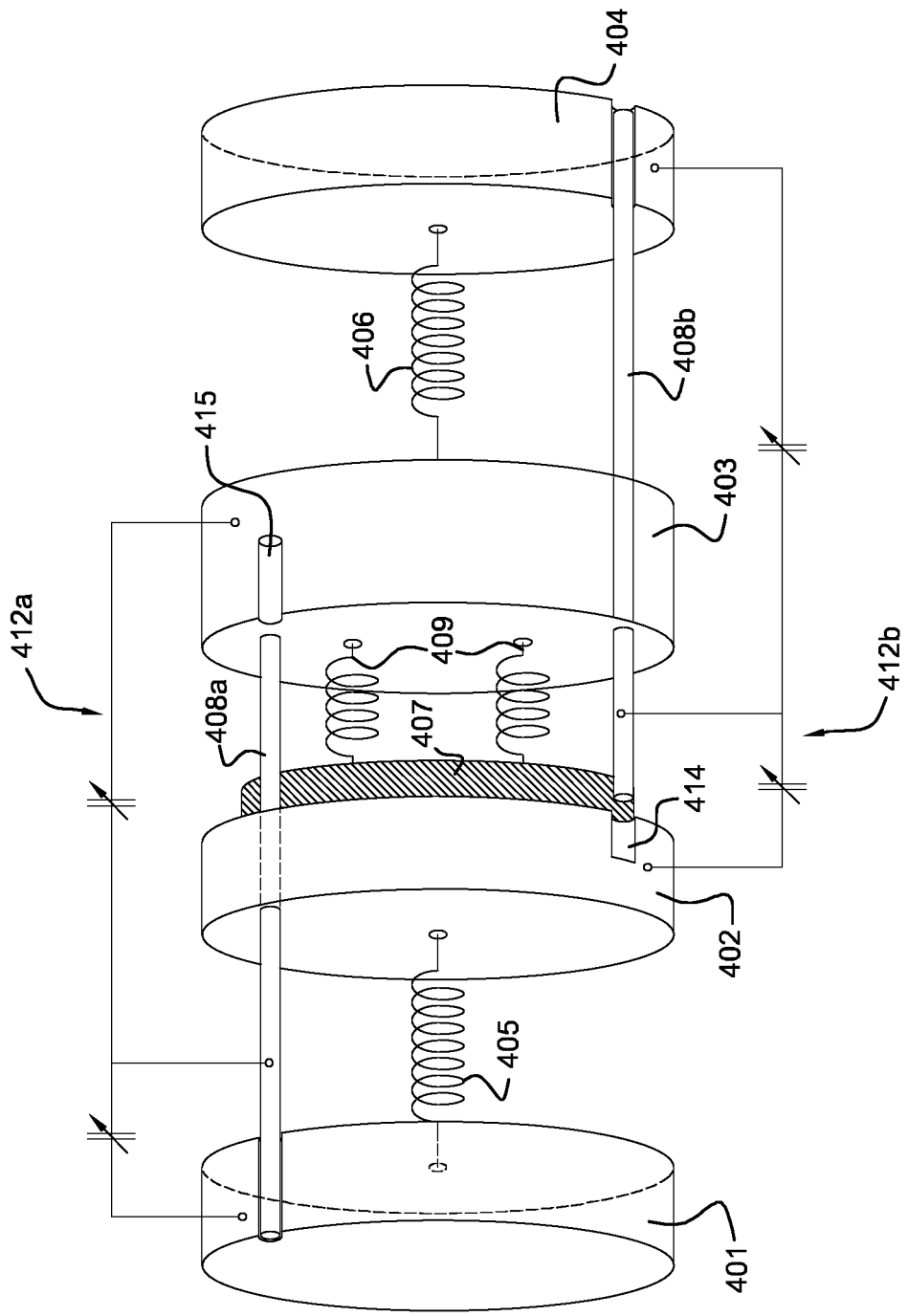

In embodiments, the spring plate (107; 207) comprises transmission elements (111; 211), wherein the second rigid body (102; 202) in the said at least one flange includes grooves configured to accommodate at least part of the transmission elements (111; 211). The transmission elements (111; 211) may be in the form of balls, cylindrical rollers, spherical rollers, etc. The spring plate (107; 207) may comprise top recesses formed on a top surface of the spring plate (107; 207), i.e., facing said at least one flange (e.g., the input flange). The top recesses may be arranged in the angular direction and each top recess may be configured to accommodate a bottom part of the transmission element (111; 211). Preferably, the top recesses may be arranged in a plurality of groups of top recesses similar to the plurality of groups of the transmission elements (111; 211). The grooves and/or the top recesses may have a shape complementary to the transmission elements (111; 211). Examples of such a spring plate (107; 207) is shown in FIGS. 1 and 2.

In embodiments, a third sensor structure (108b, 108c) comprised in the one or more sensing means is connected to the first rigid body (101; 104) in said at least one flange and electrically insulated from the first rigid body (101; 104), wherein the third sensor structure (108b, 108c) is configured to measure the first capacitance between the electrode in third sensor structure (108b, 108c) and the second rigid body (102; 103) in said at least one flange, and measure the second capacitance between the electrode and the spring plate (107) and/or at least one of the transmission elements (111). This is shown in the exemplary embodiments relating to FIG. 1.

In embodiments, a fourth sensor structure (208b, 208c) in the one or more sensing means is connected to the second rigid body (202; 203) in said at least one flange and electrically insulated from the second rigid body (202; 203), wherein the fourth sensor structure (208b, 208c) is configured to measure the first capacitance between the electrode in the fourth sensor structure (208b, 208c) and the first rigid body (201; 204) in said at least one flange, and measure the second capacitance between the electrode and the spring plate (207) and/or at least one of the transmission elements (211). This is shown in the exemplary embodiments relating to FIG. 2.

The first capacitance may be a result of a deformation of the deformable structure (105; 106; 205; 206) in the angular direction of said at least one flange, and the second capacitance may be a result of a displacement of the spring plate (107; 207) and/or at least one of the transmission elements (111; 211) with respect to the second rigid body in any of the flanges. The displacement of the spring plate (107; 207) and/or the at least one of the transmission elements (111; 211) may be angular and/or axial with respect to the second rigid body in said at least one flange. The axial displacement of the spring plate (107; 207) and/or the at least one of the transmission elements (111; 211) may relate to the disengagement of the spring plate (107; 207) and/or the at least one of the transmission elements (111; 211) from the grooves in said at least one flange. The angular displacement of the spring plate (107; 207) and/or the at least one of the transmission elements (111; 211) may relate to the angular displacement of the second rigid bodies in both flanges.

In embodiments, the second rigid body (102; 202; 302; 402; 103; 203; 303; 403) in the other of said at least one flange has a surface comprising a deformation (114; 214; 314; 414; 115; 215; 315; 415) facing a surface of the electrode (e.g., the second face as described above), wherein the electronic circuit is configured to detect disengagement of the clutch based on a change in the measured second capacitance due to a change in a distance between the surface of the electrode and the surface of the second rigid body in the other of said at least one flange. The surface of the second rigid body (102; 202; 302; 402; 103; 203; 303; 403) in the other of said at least one flange may comprise more than one deformation (114; 214; 314; 414; 115; 215; 315; 415) at least one of which facing a surface of at least one electrode, such that in any engaged position of the flanges, a deformation (114; 214; 314; 414; 115; 215; 315; 415) faces a surface of the electrode. The deformation (114; 214; 314; 414; 115; 215; 315; 415) may be a groove, depression, trench, or any other inward deformation from the surface of the other of said at least one flange (i.e., from the surface to the inside of the flange). This is shown in the exemplary embodiments relating to FIGS. 1-4. The deformation may be an outward deformation, such as a protrusion or projection from the surface of the other of said at least one flange, wherein such an outward deformation would not be in contact with the second rigid body of said at least one flange or the electrode in the engaged state.

In further embodiments, the electronic circuit is configured to detect disengagement of the clutch based on the measured second capacitance described in the above embodiments. For example, the axial disengagement between the second rigid body in said at least one flange and the spring plate (107; 207) and/or the at least one of the transmission elements (111; 211), is detected based on a change in the measured second capacitance due to a change in a distance between a surface of the electrode integrated in said at least one flange (e.g. in the sensor structure comprised in the one or more sensing means) and a surface of the spring plate (107; 207) and/or the transmission elements (111; 211), e.g. due to the axial displacement of the spring plate (107; 207) and the transmission elements (111; 211). In another example, the angular disengagement between the second rigid body in said at least one flange and the spring plate (107; 207) and/or the at least one of the transmission elements (111; 211), is detected based on a change in the measured second capacitance due to a change in a distance between a surface of the electrode integrated in said at least one flange and a surface of any one or combination of the second rigid body in the other of said at least one flange and/or the spring plate (107; 207) and/or the at least one of the transmission elements (111; 211). In this example, when the second rigid bodies disengage angularly (e.g., an angular shift between the two second rigid bodies), the distance between the surface of the electrode and the surface of the second rigid body in the other of said at least one flange may increase or decrease to a distance between the electrode and the spring plate (107; 207) and/or the at least one of the transmission elements (111; 211) and/or vice versa. In another example, when flanges or the second rigid bodies therein disengage, the flanges or the second rigid bodies are displaced angularly with respect to each other causing a change in a distance between the surface of the second rigid body (102; 202; 302; 402; 103; 203; 303; 403) in the other of said at least one flange and the surface of the electrode. In this example, when the second rigid bodies disengage angularly (e.g., an angular shift between the two second rigid bodies), the distance between the surface of the electrode and the distance between the electrode and the deformation (114; 214; 314; 414; 115; 215; 315; 415) may increase or decrease due to another portion of the surface of the second rigid body in the other of said at least one flange facing the surface of the electrode and/or vice versa.

In further embodiments, the sensor structure (108a-108d; 208a-208d; 308a-308b; 408a-408b) may form/provide an electrical circuit (112a-112d; 212a-212d; 312a-312b; 412a-412b) between the electrode and at least one of the first or second rigid body in said at least one flange and the second rigid body in the other of said at least one flange. In a first instance, a first electrical circuit (112a; 312a; 112d; 312b) may be formed/provided between the electrode in the first sensor structure (108a; 308a; 108d; 308b) and at least one of the second rigid bodies of both flanges. In a second instance, a second electrical circuit (212a; 412a; 212d; 412b) may be formed/provided between the electrode in the second sensor structure (208a; 408a; 208d; 408b) and at least one of the first rigid body of said at least one flange and the second rigid body of the other of said at least one flange. In a third instance, a third electrical circuit (112b; 112c) may be formed/provided between the electrode in the third sensor structure (108b; 108c) and the second rigid body of said at least one flange and/or the spring plate (107) and/or at least one of the transmission elements (111) in the other of said at least one flange. In a fourth instance, a fourth electrical circuit (212b; 212c) may be formed/provided between the electrode in the fourth sensor structure (208b; 208c) and at least one of the first rigid body of said at least one flange and the spring plate (207) and/or the at least one of the transmission elements (211) in the other of said at least one flange.

In further embodiments, a further capacitance may be measured by the sensor structure (108a-108d; 208a-208d) or may be determined by the electronic circuit as a combination of the first and the second capacitances. In a first instance, a first further capacitance may be measured or determined between the second rigid bodies of both flanges, preferably based on the first electrical circuit (112a; 312a; 112d; 312b). In a second instance, a second further capacitance may be measured or determined between the first rigid body of said at least one flange and the second rigid body of the other of said at least one flange, preferably based on the second electrical circuit (212a; 412a; 212d; 412b). In a third instance, a third further capacitance may be measured or determined between the second rigid body of said at least one flange and the spring plate (107) and/or at least one of the transmission elements (111) in the other of said at least one flange, preferably based on the third electrical circuit (112b; 112c). In a fourth instance, a fourth further capacitance may be measured or determined between the first rigid body of said at least one flange and the spring plate (207) and/or the at least one of the transmission elements (211) in the other of said at least one flange, preferably based on the fourth electrical circuit (212b; 212c).

The following embodiments of an overload clutch according to the present invention will be described with further reference to FIGS. 5A-5C, 6A-6C and 7A-7D.

In embodiments, said at least one flange comprises a plurality of protruding portions (535; 635; 735) arranged in an angular direction, wherein the one or more sensing means comprise a plurality of sensor structures (538; 638; 738) each having an electrode, the plurality of sensor structures (538; 638; 738) being arranged in an angular direction and being configured to measure the first capacitance between the electrodes and the plurality of protruding portions (535; 635; 735). The protruding portions (535; 635; 735) may extend axially from an inner wall of a first or second rigid body of the other of said at least one flange, and may be one of several shapes, such as rectangular, triangular, cylindrical, etc. Furthermore, the electrode may comprise a face (e.g., the first face) having a main surface complementary to a surface/side of a respective protruding portion. For example, in the case of a cylindrical protruding portion, the electrode may have a cylindrical face that is complementary to a part of a circumference of the cylindrical protruding portion. The protruding portions (535; 635; 735) may comprise a sloped surface extending in the radial direction of said at least one flange. For example, the protruding portions (535; 635; 735) may be wedge-shaped.

The number of protruding portions (535; 635; 735) and/or electrodes or sensor structures (538; 638; 738) may be two or more, three or more, four or more, five or more, six or more, seven or more, eight or more, etc. Furthermore, the number of sensor structures (538; 638; 738) or the number of electrodes for a respective protruding portion may be one or more, two or more, three or more, four or more, etc. For instance, one or more electrodes or sensor structures (538; 638; 738) may be provided for each protruding portion, such as each electrode facing a different side/surface of a protruding portion. In one example, the number of protruding portions (535; 635; 735) may be three and the number of sensor structures may be six, where two sensor structures or electrodes are facing two surfaces/sides of each of the three protruding portions (535; 635; 735), as is in the case of FIGS. 5B, 6B and 7B.

It will be understood that the plurality of sensor structures (538; 638; 738) as described with reference to FIGS. 5B, 5C, 6B, 6C, 7A-7C can comprise any one or combination of the sensor structures (108a-108d; 208a-208d; 308a-308b; 408a-408b) described with reference to FIGS. 1-4. Furthermore, other elements of the overload clutch of FIGS. 5A-5C, 6A-6C and 7A-7D may correspond to other elements of the overload clutches of FIGS. 1-4, e.g. as described below.

In further embodiments, an average first capacitance may be determined based on the measured first capacitances by the plurality of sensor structures, and an average second capacitance may be determined based on the measured second capacitances by the plurality of sensor structures. Other statistical analyses may be performed on the measured capacitances. For instance, an average change in first capacitance and/or average change in second capacitance may be determined. Furthermore, the measured capacitances by the plurality of sensor structures may be used to determine a structural state of at least part of the clutch, such as the input flange, the output flange, a part of at least one of the input and output flange (e.g., at least one of the spring plate, at least one of the plurality of springs, at least one of the transmission elements, the first rigid body, the second rigid body, the deformable structure etc.). For example, a capacitance or change thereof may be higher in a first part of the clutch than in a second part, and it can be determined that (e.g., by the electronic circuit) that the spring plate and/or the at least one of the transmission elements at the first part of the clutch or output flange may be worn out.

In further embodiments, the measured capacitances (e.g., first capacitance, second capacitance, further capacitance, plurality of first and/or second capacitances, etc.) and/or the determined capacitances (e.g., average of first capacitances, average of second capacitances, etc.) may be displayed on a display of a user device, such as a personal computer, a smart phone, a tablet, etc. Additionally or alternatively, a value of the determined external torque may be displayed on the display of the user device, and/or a signal may be displayed on the display of the user device, such as via an alert, a warning, a message, a notification, providing information to the user about the status of the overload clutch. For example, the user may be notified that the clutch has disengaged. In another example, the user may be warned that the external torque is close to the predetermined torque threshold, such as the external torque is at least 80%, at least 85%, at least 90%, at least 95%, at least 99%, etc., of the predetermined torque threshold.

Figure 5B:
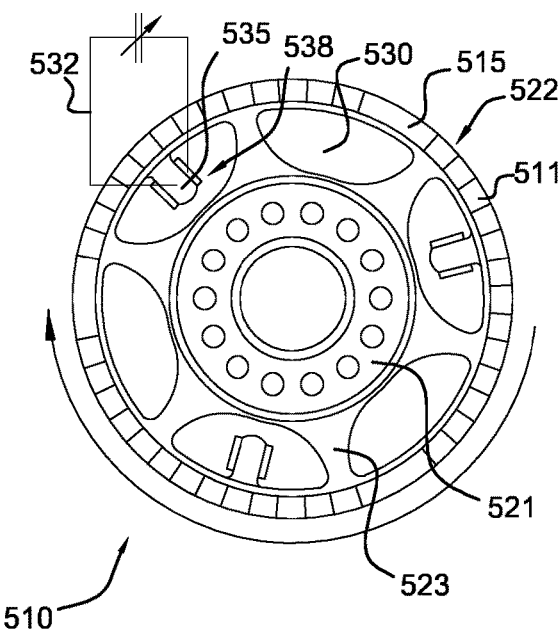
FIG. 5B schematically illustrates a bottom view of an example embodiment of an input flange according to the present invention.
Figure 6A:
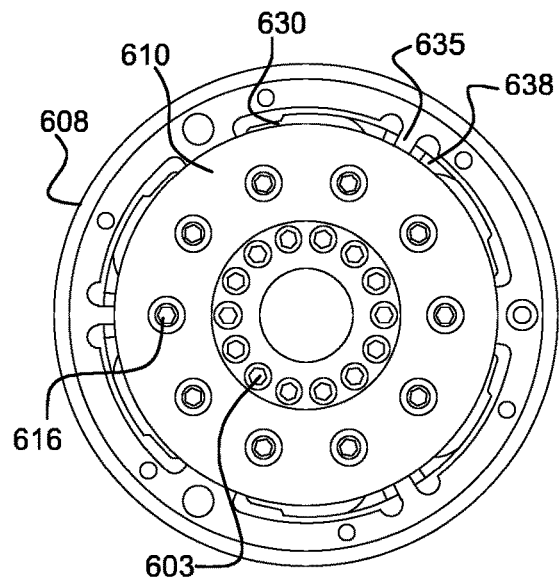
FIG. 6A schematically illustrates a top view of an example embodiment of a clutch according to the present invention.
Figure 6B:
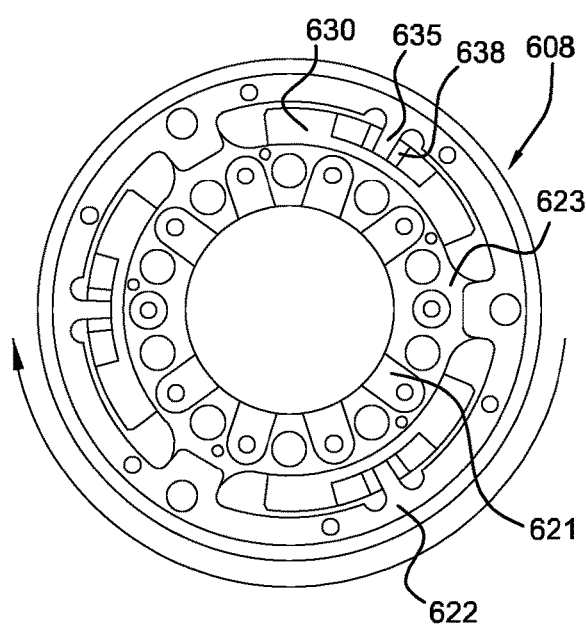
FIG. 6B schematically illustrates a bottom view of an example embodiment of an output flange according to the present invention.

In embodiments, the deformable structure (105; 106; 205; 206) comprises a plurality of spokes. The spokes (523; 623; 723) may be extending radially from the first rigid body (521; 621; 721) to the second rigid body (522; 622; 722) of said at least one flange. The number of spokes may be two or more, three or more, four or more, five or more, six or more, seven or more, eight or more, etc. In further embodiments, the protruding portions may be provided in between the spokes. The number of protruding portions may equal the number of spokes in the deformable structure, for example three protruding portions (638; 738) and three spokes (623; 723) as shown in FIGS. 6B and 7B. The number of protruding portions may be less than the number of spokes in the deformable structure, for example three protruding portions (538) and six spokes (523) as shown in FIG. 5B. Alternatively, the number of protruding portions may be greater than the number of spokes in the deformable structure, for example one or more protruding portions between the spokes.

In embodiments, the clutch is a cam clutch, a friction clutch or a combined friction cam clutch (CFCC). The cam clutch may be based on the ball-recess principle. Furthermore, the cam mechanism translates a rotary motion in a translational one, where the spring plate (107; 207) moves with respect to the housing (e.g., due to rotation of a cam) which allows straightforward clutch disengagement sensing using the same hardware as the one or more sensing means. The cam clutch may also be called a positive clutch or a positive torque limiter. Examples of the cam clutch and/or the CFCC are displayed in FIGS. 1, 2, 5-7. Examples of the friction clutch are displayed in FIGS. 3 and 4. For the friction clutch, the spring plate is a friction plate (307; 407), and the plurality of springs (309; 409) allow the friction plate (307; 407) to move axially relative to at least one of the first rigid body (104; 204) and the second rigid body (103; 203) in the other of said at least one flange and to respectively engage to or disengage from the second rigid body (102; 202) of said at least one flange. Therefore the second rigid body (103; 203) of the other of said at least one flange engages to or disengages from the second rigid body (102; 202) of said at least one flange. The friction clutch may also be called a slip clutch.

In further embodiments, in case of a cam clutch or a CFCC, the second rigid body (102; 202) in said at least one flange is a cam (510; 610; 710), the first rigid body (104; 204) in the other of said at least one flange is a bearing (e.g., roller bearing or ball bearing), the first rigid body (101; 201) in said at least one flange is a hub (502; 702) connected to a gear unit and/or a motor, and the second rigid body (103; 203) in the other of said at least one flange is an output part (508; 608; 708) of a clutch, formed by the bearing, the spring plate (512) and said output part (508; 608; 708). The hub (502; 702) is connected/fastened by a first connecting/fastening means (516; 616; 716) to the cam (510; 610; 710). An inner ring (507; 707) of the bearing is connected/fastened to the output part (508; 608; 708) by means of a second connecting/fastening means (516; 716). An outer ring (505; 705) of the bearing is connected/fastened to a part of a device, such as an axis on which a device (e.g. a robot) is capable of moving, by a third connecting/fastening means (519; 719). The bearing may further comprise a plurality of rollers or balls (509; 709) between the inner and outer rings (505, 507; 705, 707) The connecting/fastening means may be bolt/screw connection with a bolt/screw stud, a bolt/screw connection with a through bolt/screw, a bolt/screw connection with a through bolt/screw and a nut.

Figure 5C:
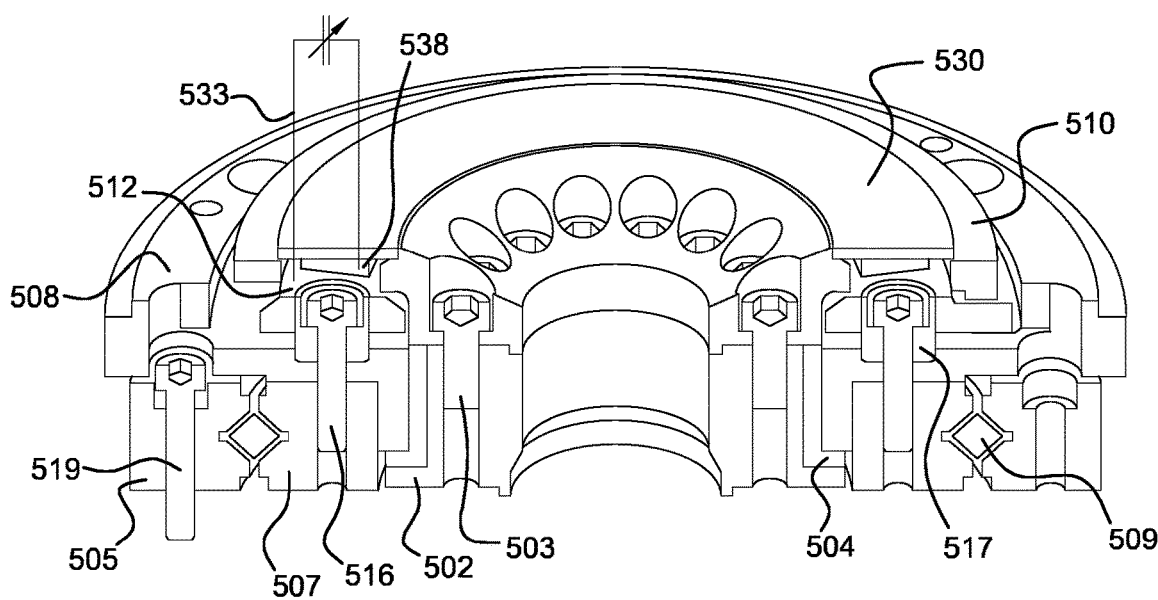
FIG. 5C schematically illustrates a cut-out perspective view of an example embodiment of a clutch according to the present invention.
Figure 7A:
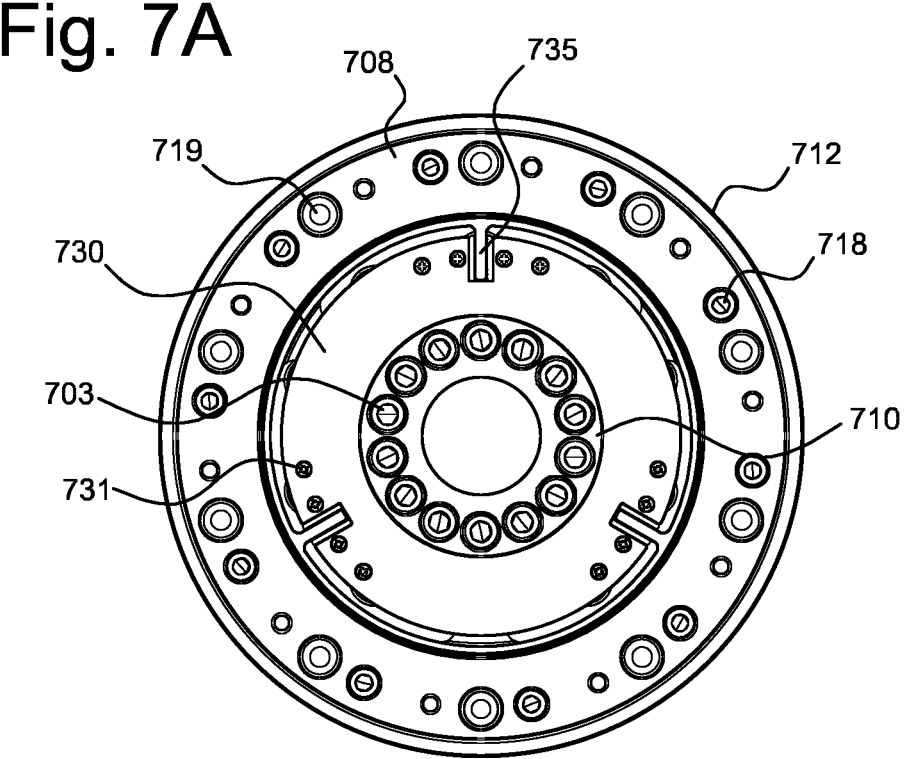
FIG. 7A schematically illustrates a top view of an example embodiment of a clutch according to the present invention.
Figure 7B:
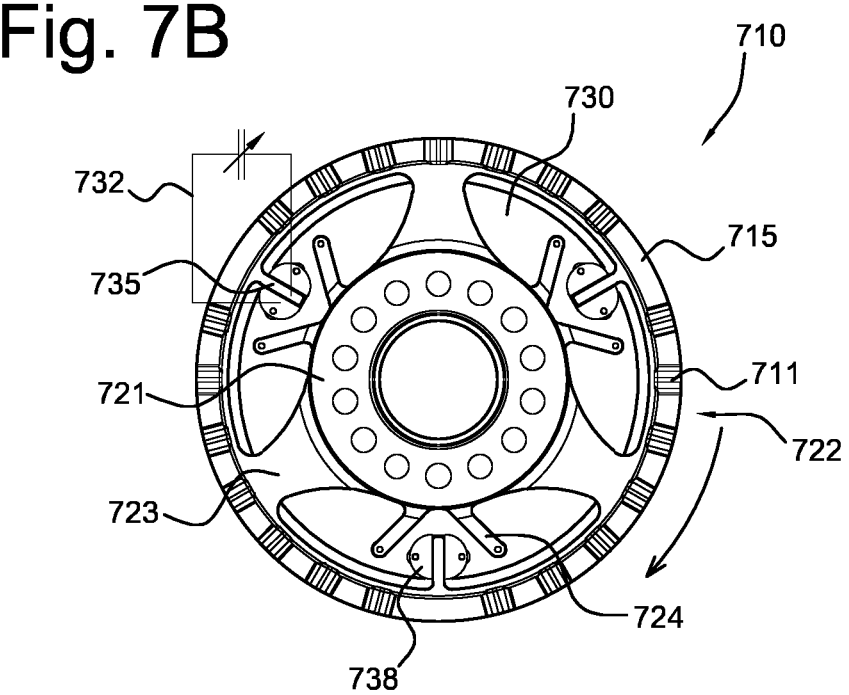
FIG. 7B schematically illustrates a bottom view of an example embodiment of an input flange according to the present invention.
Figure 7C:
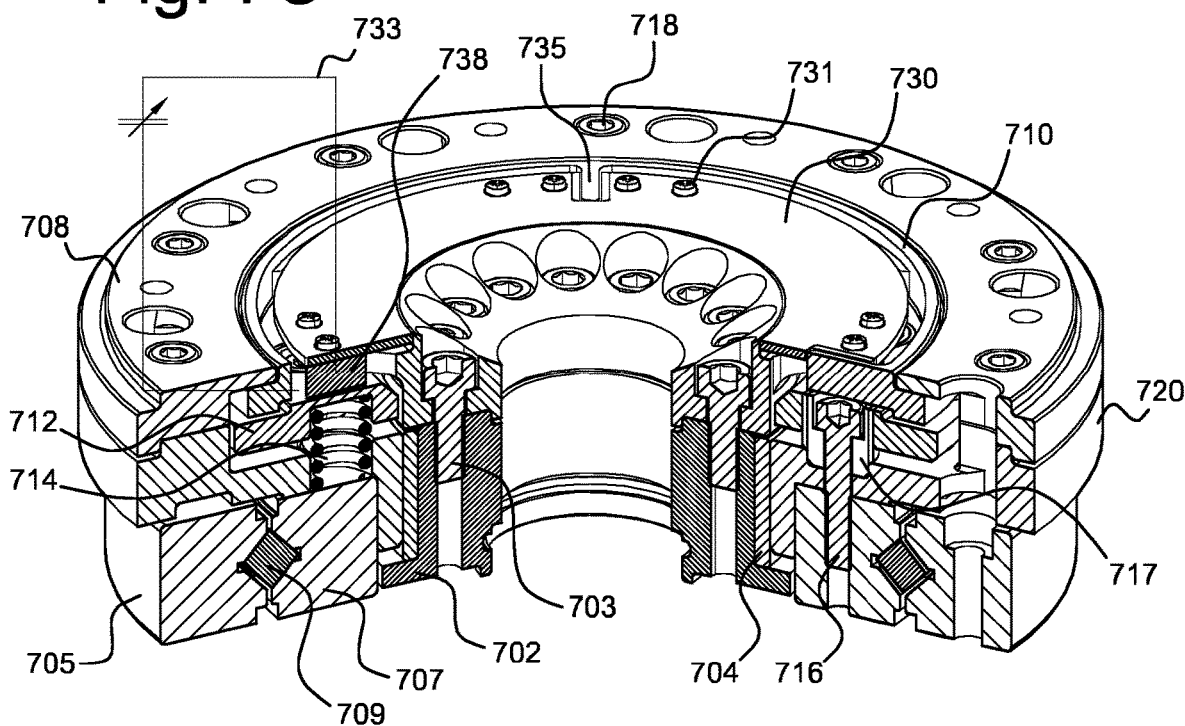
FIG. 7C schematically illustrates a cut-out perspective view of an example embodiment of a clutch according to the present invention.
Figure 7D:
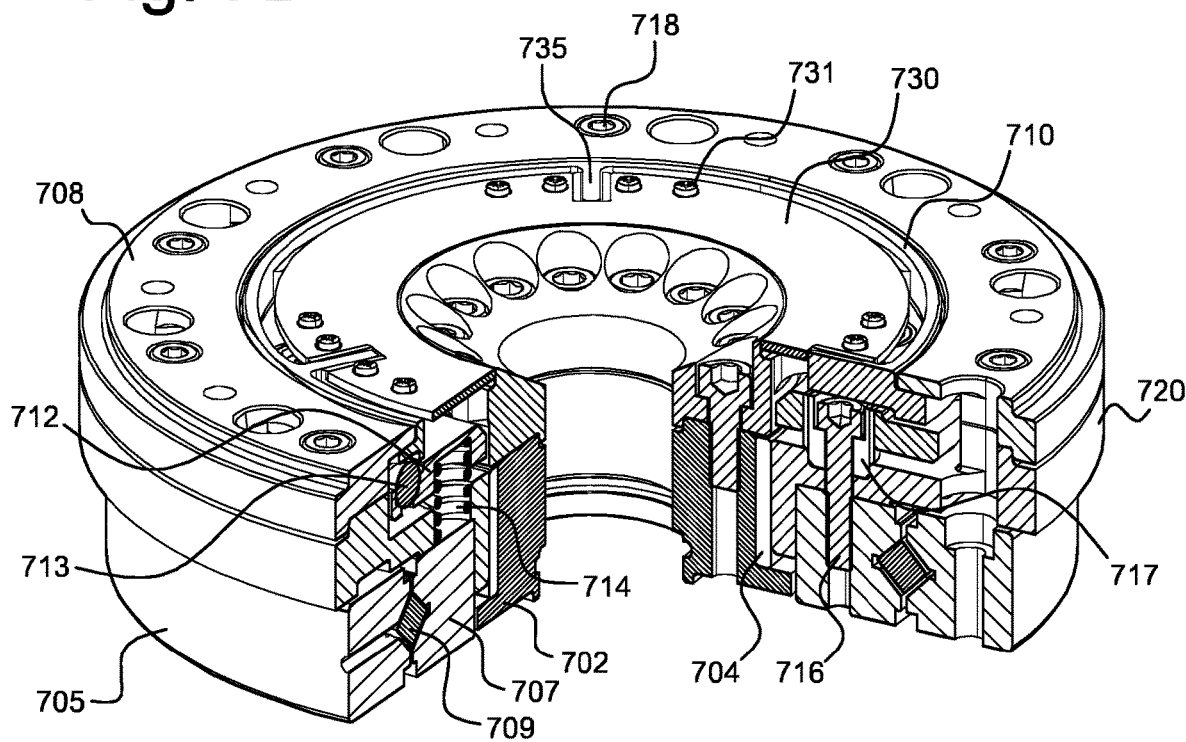
FIG. 7D schematically illustrates a cut-out perspective view of an example embodiment of a clutch according to the present invention.

FIGS. 5C, 7C and 7D further show example embodiments of a cam clutch or a CFCC where the parts of the clutch may be connected and fastened to each other. These example embodiments are not intended to limit the scope of the invention in any way. In these example embodiments, the first connecting/fastening means (503; 703) are in the form of bolt/screw connection with a through bolt/screw accommodated through holes of the hub (502; 702) and the cam (510; 710). The second connecting/fastening means (516; 716) are in the form of bolt/screw connection with a through bolt/screw accommodated through holes of the output part (508; 708) and the inner ring (507; 707). The third connecting/fastening means (519; 719) are in the form of bolt/screw connection with a through bolt/screw accommodated through holes of the outer ring (505; 705). The second connecting/fastening means (516; 716) are provided with sliders (517; 717) through which the second connecting/fastening means (516; 716) are inserted. The sliders (517; 717) are bolt/screw sliders. Other forms of connecting/fastening means may be bolt/screw connection with a bolt/screw stud, a bolt/screw connection with a through bolt/screw, a bolt/screw connection with a through bolt/screw and a nut.

In further embodiments, the CFCC further comprises a plurality of transmission elements (111; 211; 713) which are arranged in the angular direction between the spring plate (107; 207; 712) and the cam (710). The plurality of transmission elements (111; 211; 713) may be arranged in a plurality of groups of transmission elements (111; 211; 713), such as in at least two groups, at least three groups, at least four groups or at least five groups, preferably in three groups. The plurality of groups of transmission elements (111; 211; 713) may have a different number of transmission elements (111; 211; 713). For example, a first and second group have four transmission elements (111; 211; 713), and a third and fourth group have six transmission elements (111; 211; 713). Preferably, the number of transmission elements (111; 211; 713) in each group is the same (i.e., the total number of transmission elements is evenly grouped among the plurality of groups of transmission elements).

In further embodiments, the CFCC comprises a cam having a ring-shaped part having grooves formed on a bottom surface of the ring-shaped part, i.e., facing the spring plate (512; 712). The grooves are arranged in the angular direction and configured to accommodate a top part of the transmission elements (713). The grooves may be arranged in a plurality of groups of grooves (511; 711), preferably, similar to the plurality of groups of the transmission elements (713). The ring-shaped part of the cam may further have flat areas (515; 715) which are arranged in the angular direction between subsequent grooves (511; 711), as shown in FIGS. 5B and 7B. The flat areas (515; 715) may be arranged in a plurality of groups based on the arrangement of the grooves (511; 711). For instance, the flat areas (515; 715) may have a size based on the arrangement of the grooves (511; 711) in the plurality of groups, such as a distance between the plurality of groups of the grooves (511; 711) and/or a distance between the grooves (511; 711) within a group of the plurality of groups of the grooves (511; 711). For instance, the grooves (511; 711) may arranged in three groups of seven grooves (511; 711) each, and the flat areas (515; 715) are arranged as three flat areas (515; 715) between said three groups of grooves (511; 711), as is in the case of FIGS. 5B and 7B.

FIGS. 5A, 5B, 7A and 7B show a sensing mean, such as a printed circuit board, PCB (530; 730), integrated in the cam (510; 710). The PCB (530; 730) may be comprised in the one or more sensing means for allowing the electronic circuit to electrically connect to the at least one sensor structure (538; 738). FIG. 5B shows that the cam (510; 710) comprises three protruding portions (535; 735), with two sensor structures for each protruding portion. Each sensor structure (538; 738) forms/provides a first electrical circuit (532; 732) between the electrode in the sensor structure (538; 738) and the cam (510; 710), preferably the protruding portion (535; 735), and is configured to measure a first capacitance, e.g. of the first electrical circuit (532; 732), between the electrode in the sensor structure (538; 738) and the cam (510; 710), preferably the protruding portion (535; 735). FIGS. 7A, 7C and 7D further show that the PCB (730) is connected/fastened to the first rigid body (721) by means of screws (731). Furthermore, the at least one sensor structure (738) may be connected/fastened to the PCB and/or the first rigid body (721) by means of screws (731). Connecting/fastening means other than screw can also be understood by a person skilled in the art. Additionally, or alternatively, the electrode of the sensor structure (738) may be soldered to the PCB. FIG. 7B shows that the PCB may be connected/fastened to at least one supporting structure (724) comprised in the first rigid body (721). The supporting structure (724) may provide the connecting/fastening means to be closer to the sensor structure (738), making the one or more sensing means (e.g., the PCB) more rigid.

FIG. 7B further shows that the first rigid body (721) comprises a plurality of supporting structures (724) protruding radially. The number of supporting structures (724) may be two or more, three or more, four or more, five or more, six or more, seven or more, eight or more, etc. In embodiments, the supporting structures (724) may be provided in between the spokes (723). In further embodiments, the supporting structures (724) may be provided in between the spokes (723) and the protruding portions (735). The number of supporting structures (724) may equal the number of protruding portions (738) and/or spokes (723). The number of supporting structures (724) may be greater than the number of protruding portions (738) and/or the number of spokes (723), e.g., double the number of protruding portions (738) and/or the number of spokes (723), as shown in FIGS. 6B and 7B. The number of protruding portions may be less than the number of protruding portions (738) and/or the number of spokes (723). The PCB is preferably electrically insulated from any of the at least one supporting structure (724) and/or the first rigid body (521; 721).

FIGS. 5C and 7C show a sensor structure (535; 735) forming a second electrical circuit (533; 733) between the spring plate (512; 712) and the electrode of the sensing structure (538; 738). The sensor structure (538; 738) may be configured to measure a second capacitance, e.g. of the second electrical circuit (533; 733), between the electrode of the sensing structure (538; 738) and the spring plate (512; 712). The first (532; 732) and second (533; 733) electrical circuits may form/provide an electrical circuit between the second rigid body (522; 722) in the cam (510; 710) and/or the protruding portion (535; 735) and the spring plate (512; 712), similar to the first and/or third electrical circuit (112a, 112b) described with reference to FIG. 1.

The overload clutch may further comprise a sliding bearing (504; 704), wherein the hub (502; 702), the sliding bearing (504; 704) and the cam (510; 710) form an inner clutch part that is rotatable connected to an outer clutch part formed by the roller bearing, the output part (508; 708), the spring plate (512; 712) and the springs (714) allowing the displacement of the spring plate (512; 712) axially with respect to any one or combination of the cam (510; 710), the output part (508; 708), the bearing (505, 507; 705; 707) and/or another output part (720). Due to the friction between the hub (502) and the sliding bearing (504) shown in FIG. 5C, not all the torque is transferred through the cam (510). The inventors have found that by removing a part of the sliding bearing (504; 704) including in the overload clutch of FIGS. 7C and 7D another output part (720), all the torque can be transferred through the cam (710). This allows for improving/increasing the sensitivity of the one or more sensing means, particularly, the sensing structure (735) therein. The other output part (720) may be connected/fastened to the output part (708) by means of another connecting/fastening means (718), which may be similar to the connecting/fastening means described above.

The overload clutch of FIG. 7D corresponds in many aspects and/or features to the overload clutch of FIG. 7C, therefore, only the differences will be described in detail for the sake of brevity. FIG. 7D shows transmission elements (713) which correspond in many ways to the transmission elements (111; 211) described with reference to FIGS. 1 and 2. In FIG. 7D, the spring plate (712) comprises top recesses formed on a surface of the spring plate (712), i.e., facing the cam (710), configured to support the transmission elements (713). Furthermore, the other output part (720), e.g. an inner wall thereof, may be configured to further support the transmission elements (713). Additionally or alternatively, the output part (708), e.g. an inner wall thereof, may be configured to further support the transmission elements (713). The inner wall of the output part (708) and/or the other output part (720) allows the transmission elements (713) to stay in place (e.g., on the spring plate 712 or in the recesses formed thereon) when the overload clutch moves between the engaged and disengaged states, i.e., when the spring plate (712) is displaced axially.

Figure 6C:
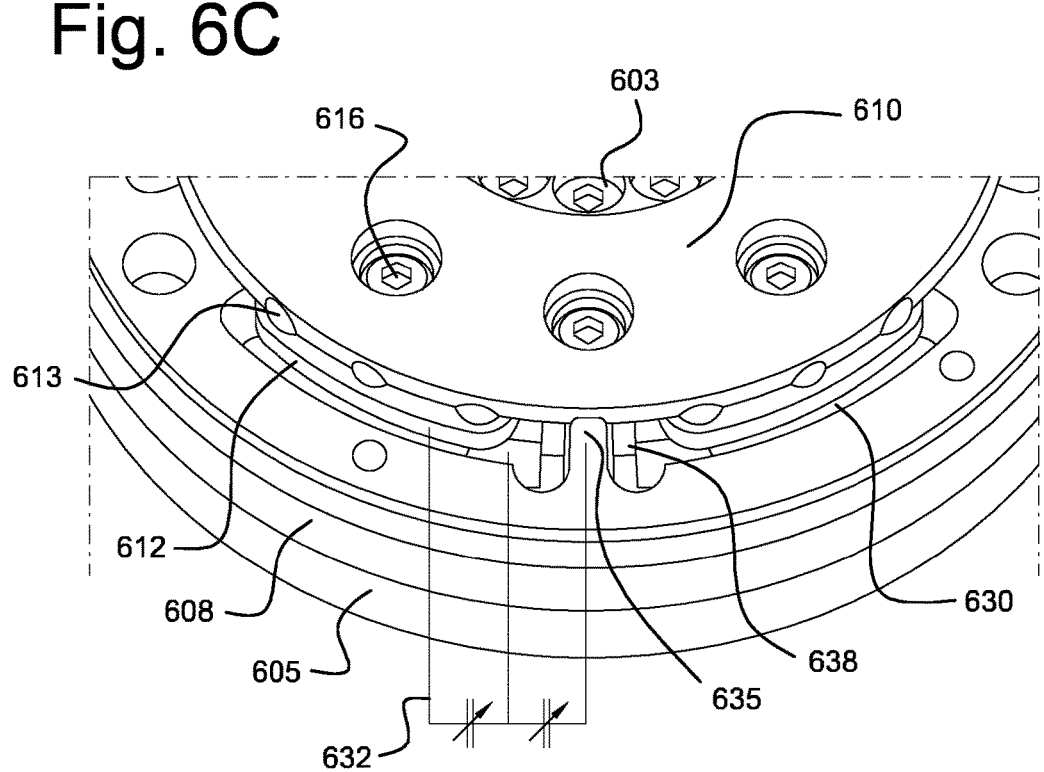
FIG. 6C schematically illustrates a perspective view of an example embodiment of a clutch according to the present invention.

FIG. 6C schematically illustrates a perspective view of an example embodiment of a clutch according to the present invention. The overload clutch of FIG. 6C corresponds in many aspects and/or features to the overload clutch of any one of FIGS. 5O, 7C and 7D, therefore, only the differences will be described in detail for the sake of brevity. For instance, a first (603) and second (616) connecting/fastening means, a spring plate (612), transmission elements (613), and an outer ring (605) of a bearing may respectively correspond to the first (503;703) and second (516; 716) connecting/fastening means, the spring plate (512; 712), the transmission elements (513; 713) and the outer ring (505; 705) of the bearing in FIGS. 5C, 7C and 7D.

FIG. 6A schematically illustrates a top view of an example embodiment of an overload clutch (e.g., of FIG. 6C) according to the present invention. FIG. 6B schematically illustrates a bottom view of an example embodiment of an output flange of an overload clutch (e.g., of FIGS. 6A and 6C) according to the present invention. In the output flange, particularly in the output part (608), there is integrated at least one protruding portion (635), in this case three protruding portion (635). The protruding portion (635) may be part of the output part (608).

FIGS. 6A and 6B show one or more PCBs (630), integrated in the output flange, particularly in the output part (608). The one or more PCBs (630) may be comprised in the one or more sensing means and/or electrically connecting the electronic circuit to the at least one sensor structure (638). FIG. 6B shows that the one or more sensing means comprise three protruding portions (635). The at least one sensor structure (638) may be the first and/or second sensor structure (108*c*, 108*d*) as described with reference to FIG. 1.

As shown in FIG. 6C, a sensor structure (638) forms an electrical circuit (632), which may correspond to the first and/or third electrical circuit (112*c*, 112*d*) described with reference to FIG. 1. The electrical circuit (632) is formed/provided between the electrode of the sensor structure (638) and at least one of the output part (608) (e.g., the first rigid body 621 as shown in FIG. 6B, or the second rigid body (622) and the protruding portion (635) and between the electrode of the sensor structure (638) and at least one of the spring plate (61) and at least one transmission element (613). Each sensor structure (638) is configured to measure a first capacitance of the electrical circuit (632) between the electrode of the sensor structure (638) and at least one of the output part (608) (e.g., the first rigid body 621 as shown in FIG. 6B, or the second rigid body 622) and the protruding portion (635), and a second capacitance of the electrical circuit (632) between the electrode of the sensor structure (638) and at least one of the spring plate (612) and at least one transmission element (613).

In FIG. 6C, a first sensor structure (638) comprises a first face and a second face, the first face having a main surface facing the protruding portion (635), and the second face having a main surface facing the spring plate (612) and/or the cam (610). The second sensor structure (638), connected to an opposite side of the protruding portion (635) with respect to the first sensor structure (638), also comprises a first and second faces similar to the first sensor structure (638).

The skilled person shall understand how to implement a replacement or additional sensor structure (208*a*-208*d*), as described with reference to FIGS. 1-2, in any of the clutches described with reference to FIGS. 5-7.

Other details relating to the general structure of the cam clutch and/or the CFCC shall be understood by the skilled person.

Furthermore, the skilled person shall understand the general structure of a friction clutch, when applying the features of the overload clutch described above with reference to FIGS. 3 and 4.

In embodiments, a device (e.g., a robot, industrial robot, high-speed industrial robot, etc.) comprise an overload clutch as described above. The device may comprise a gear unit connected to the hub (502; 702) and a motor connected to the gear unit, said motor being configured to provide torque to the roller bearing (506; 706) through the gear unit. The hub (502; 702) may transfer/transmit the torque to the output flange (508; 708) as described herein.

The clutch may be connected, e.g. rigidly connected, or fastened to the motor via an actuator housing that is connected to clutch via the third connection or fastening means (519; 719), as described above. The gear unit may comprise a circular spline, wave generator and a flexspline. The gear unit or a rotatable part of the gear unit may be further connected, e.g. rigidly connected, or fastened to the hub (502; 702) via the flexspline and a fourth connection or fastening means, e.g. in the form of a bolt/screw connection with a bolt/screw stud, a bolt/screw connection with a through bolt/screw, a bolt/screw connection with a through bolt/screw and a nut.

In embodiments, the motor may comprise a rotor and a stator. The stator may be connected, e.g. rigidly connected, or fastened to the actuator housing via motor connection or fastening provision. The rotor is configured to provide torque to the hub (502; 702) through the gear unit, for e.g. by coupling the rotor to the rotatable part of the gear unit.

In an embodiment, the gear unit may be a strain wave gearing, preferably a harmonic drive. The device may be used in a control algorithm comprising the step of actively braking (including stopping) the motor when the torque at the cam (510; 710) exceeds a predetermined torque threshold. The clutch is thus moved from the engaged state to the disengaged state. The higher the motor braking torque, the faster the motor inertia can be slowed down and the smaller the angular position difference between the clutch and the motor. The industrial robot may be used in a control algorithm comprising the step of controlling the position of the motor and gear unit with the clutch in the disengaged state such that the clutch can move from the disengaged state to the engaged state. The control algorithm may further comprise the step of braking, and preferably stopping, the motor.

The invention claimed is:

1. An overload clutch comprising an input flange and an output flange, said clutch being configured to transmit torque between the input flange and the output flange and to disengage the clutch when the torque exceeds a predetermined threshold,
    wherein the clutch comprises one or more sensing means at least partially integrated in at least one of the input and output flanges, and
    wherein the one or more sensing means are adapted to jointly determine the torque transmitted between both flanges and detect the disengagement of the clutch, wherein, that said at least one flange comprises a first rigid body and a second rigid body connected to each other via a deformable structure deformable in an angular direction of said at least one flange, the deformable structure being defined by at least one torsion spring constant, and that
    the one or more sensing means comprise:
    a sensor structure having an electrode connected to one of the first and second rigid bodies and electrically insulated therefrom, the sensor structure being configured to measure a first capacitance between the electrode and the other of said one of the first and second rigid bodies and configured to measure a second capacitance between the electrode and the other of said at least one flange, and
    an electronic circuit configured to determine the external torque based on the measured first capacitance and configured to detect disengagement of the clutch based on the measured second capacitance.

2. The clutch according to claim 1, wherein the electrode comprises a first face and a second face, the first face having a main surface facing a protruding portion of the other of said one of the first and second rigid bodies, and the second face having a main surface facing the other of said at least one flange.

3. The clutch according to claim 1, wherein the electrode comprises a base surface and a sloped surface, the base surface facing a protruding portion of the other of said one of the first and second rigid bodies, and the sloped surface extending in the angular direction of said at least one flange.

4. The clutch according to claim 1, wherein a first sensor structure in the one or more sensing means is connected to the first rigid body and electrically insulated therefrom,
   wherein the first sensor structure is configured to measure the first capacitance between the electrode in the first sensor structure and the second rigid body in said at least one flange, and measure the second capacitance between the electrode and the second rigid body in the other of said at least one flange.

5. The clutch according to claim 1, wherein a second sensor structure in the one or more sensing means is connected to the second rigid body and electrically insulated therefrom,
   wherein the second sensor structure is configured to measure the first capacitance between the electrode in the second sensor structure and the first rigid body in said at least one flange, and measure the second capacitance between the electrode and the second rigid body in the other of said at least one flange.

6. The clutch according to claim 1, wherein the second rigid body in the other of said at least one flange comprises a spring plate and a plurality of springs allowing the spring plate to move axially relative to the second rigid body and to respectively engage or disengage both flanges.

7. The clutch according to claim 6, wherein the spring plate comprises transmission elements,
   wherein the second rigid body in the input flange includes grooves configured to accommodate the transmission elements.

8. The clutch according to claim 6, wherein a third sensor structure in the one or more sensing means is connected to the first rigid body and electrically insulated therefrom,
   wherein the third sensor structure is configured to measure the first capacitance between the electrode in third sensor structure and the second rigid body in said at least one flange, and measure the second capacitance between the electrode and the spring plate and/or at least one of the transmission elements.

9. The clutch according to claim 6, wherein a fourth sensor structure in the one or more sensing means is connected to the second rigid body and electrically insulated therefrom,
   wherein the fourth sensor structure is configured to measure the first capacitance between the electrode in the fourth sensor structure and the first rigid body in said at least one flange, and measure the second capacitance between the electrode and the spring plate and/or at least one of the transmission elements.

10. The clutch according to claim 1, wherein the second rigid body in the other of said at least one flange has a surface comprising a deformation facing a surface of the electrode,
    wherein the electronic circuit is configured to detect disengagement of the clutch based on a change in the measured second capacitance due to a change in a distance between the surface of the electrode and the surface of the second rigid body in the other of said at least one flange.

11. The clutch according to claim 1, wherein said at least one flange comprises a plurality of protruding portions arranged in an angular direction,
    wherein the one or more sensing means comprise a plurality of sensor structures each having an electrode, the plurality of sensor structures being arranged in an angular direction and being configured to measure the first capacitance between the electrodes and the plurality of protruding portions.

12. The clutch according to claim 1, wherein the deformable structure comprises a plurality of spokes.

13. The clutch according to claim 1, wherein the clutch is a cam clutch, a friction clutch or a combined friction cam clutch.

14. A device comprising a clutch according to claim 1, said device comprising:
    a gear unit connected to the input flange; and
    a motor connected to the gear unit, configured to provide torque to the input flange through the gear unit.

* * * * *